United States Patent
Bhattacharjee et al.

(10) Patent No.: US 9,969,150 B2
(45) Date of Patent: May 15, 2018

(54) MULTILAYER FILMS OF FDCA-BASED POLYESTERS

(71) Applicant: Dow Global Technologies LLC, Midland, MI (US)

(72) Inventors: Debkumar Bhattacharjee, Blue Bell, PA (US); Steven R. Jenkins, Traverse City, MI (US); Kalyan Sehanobish, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 365 days.

(21) Appl. No.: 14/653,753

(22) PCT Filed: Dec. 18, 2013

(86) PCT No.: PCT/US2013/076274
§ 371 (c)(1),
(2) Date: Jun. 18, 2015

(87) PCT Pub. No.: WO2014/100265
PCT Pub. Date: Jun. 26, 2014

(65) Prior Publication Data
US 2015/0343746 A1    Dec. 3, 2015

Related U.S. Application Data

(60) Provisional application No. 61/740,177, filed on Dec. 20, 2012.

(51) Int. Cl.
*B32B 27/08*    (2006.01)
*B32B 27/32*    (2006.01)
*B32B 7/02*     (2006.01)
*B32B 27/30*    (2006.01)
*B32B 27/34*    (2006.01)
*B32B 27/28*    (2006.01)
*C08G 63/181*   (2006.01)
*B32B 15/08*    (2006.01)
*B32B 27/36*    (2006.01)

(52) U.S. Cl.
CPC ............... *B32B 27/08* (2013.01); *B32B 7/02* (2013.01); *B32B 15/08* (2013.01); *B32B 27/28* (2013.01); *B32B 27/304* (2013.01); *B32B 27/306* (2013.01); *B32B 27/32* (2013.01); *B32B 27/34* (2013.01); *B32B 27/36* (2013.01); *C08G 63/181* (2013.01); *B32B 2255/10* (2013.01); *B32B 2255/205* (2013.01); *B32B 2255/26* (2013.01); *B32B 2307/518* (2013.01); *B32B 2307/7242* (2013.01); *B32B 2307/7244* (2013.01); *B32B 2307/7246* (2013.01); *B32B 2439/70* (2013.01); *Y10T 428/24942* (2015.01); *Y10T 428/3192* (2015.04); *Y10T 428/31678* (2015.04); *Y10T 428/31739* (2015.04); *Y10T 428/31786* (2015.04); *Y10T 428/31938* (2015.04)

(58) Field of Classification Search
CPC ....................... B32B 27/08–27/34; B32B 7/02
See application file for complete search history.

(56) References Cited

U.S. PATENT DOCUMENTS

| | | | |
|---|---|---|---|
| 5,350,622 A * | 9/1994 | Speer | A23L 3/3436 428/215 |
| 5,562,984 A | 10/1996 | Mortlock et al. | |
| 5,958,581 A | 9/1999 | Khanarian et al. | |
| 6,063,464 A | 5/2000 | Charbonneau et al. | |
| 6,165,571 A * | 12/2000 | Lykke | B32B 27/08 428/35.8 |
| 6,342,300 B1 | 1/2002 | Bengs et al. | |
| 6,403,231 B1 * | 6/2002 | Mueller | B32B 27/20 428/338 |
| 7,202,326 B2 | 4/2007 | Kuroda et al. | |
| 7,645,852 B2 | 1/2010 | Terado et al. | |
| 8,083,064 B2 | 12/2011 | Boswell et al. | |
| 8,981,037 B2 | 3/2015 | Eritate et al. | |
| 2002/0115817 A1 | 8/2002 | Hayes | |
| 2006/0009611 A1 | 1/2006 | Hayes | |
| 2007/0100122 A1 | 5/2007 | Crawford et al. | |
| 2008/0254281 A1 * | 10/2008 | Chen | B29C 51/004 428/335 |
| 2010/0143709 A1 | 6/2010 | Baer et al. | |
| 2011/0071238 A1 | 3/2011 | Bastioli et al. | |
| 2011/0282020 A1 | 11/2011 | Sipos | |

(Continued)

FOREIGN PATENT DOCUMENTS

| | | |
|---|---|---|
| CN | 102718955 A | 10/2012 |
| GB | 1164374 A | 9/1969 |

(Continued)

OTHER PUBLICATIONS

Machine translation of JP2008-291244. Retrieved Aug. 4, 2017.*
Gomes et al. "Synthesis and Characterization of Poly(2,5-furan dicarboxylate)s Based on a Variety of Diols". Journal of Polymer Science Part A: Polymer Chemistry, vol. 49 (2011); pp. 3759-3768.*
Khrouf, A. et al. "Polyesters bearing furan moieties—A detailed investigation of the polytransesterification of difuranic diesters with different diols"; Macromol Chem. Phys., 199, 2755-2765, 1998.

(Continued)

*Primary Examiner* — Prashant J Khatri

(57) ABSTRACT

A multilayer film comprising (a) a biaxially-oriented polyethylene furanoate (BO-PEF) polymer layer, (b) an optional ink layer, (c) a bonding layer, and (d) a sealant layer, wherein the BO-PEF polymer has an $O_2$ gas permeability of less than 0.25 cc-mil/100 in.$^2$ 24 hrs atm at 80% relative humidity, or a moisture permeability of less than 0.5 g-mil/100 in.$^2$ 24 hrs atm at 38° C., or both. The film may be formed from microlayers of BO-PEF-based polymer and polymer with a melting point of at least 5° C. greater than the melting point of the BO-PEF-based polymer.

12 Claims, No Drawings

(56) References Cited

U.S. PATENT DOCUMENTS

| | | | |
|---|---|---|---|
| 2012/0264047 A1 | 10/2012 | Farrugia et al. | |
| 2012/0288693 A1* | 11/2012 | Stanley | B32B 7/12 428/213 |
| 2013/0095263 A1 | 4/2013 | Carman, Jr. et al. | |

FOREIGN PATENT DOCUMENTS

| | | | | |
|---|---|---|---|---|
| JP | 2005325170 A | | 11/2005 | |
| JP | 2006028324 A | | 2/2006 | |
| JP | 2006096845 A | | 4/2006 | |
| JP | 2008075068 A | | 4/2008 | |
| JP | 2008291244 A | * | 12/2008 | |
| JP | 2010280767 A | | 12/2010 | |
| WO | WO 0076765 A1 | * | 12/2000 | B29C 47/0021 |
| WO | WO 2010077133 A1 | * | 7/2010 | C08G 63/181 |

OTHER PUBLICATIONS

Gomes, M., et. al., "Synthesis and Characterization of poly(2,5-furan dicarboxylate) based on a variety of diols", published online Jun. 20, 2011 in Wiley Online Library (wileyonlinelibrary.com), J. Polym Sci Part A: Polym Chem 49, 3759-3768, 2011.

T. G. Fox, Bull. Am. Physics Soc., vol. 1(3), p. 123 (1956).

Okada, Masahiko, et al.,"Structure-biodegradability relationship of polyesters containing furan rings", Polymer Preprints, American Chemical Society, US, vol. 39, No. 2, Jan. 1, 1998, pp. 152-153.

PCT/US2013/076274, International Search Report and Written Opinion dated Mar. 21, 2014.

PCT/US2013/076274, International Preliminary Report on Patentability dated Jul. 2, 2015.

* cited by examiner

MULTILAYER FILMS OF FDCA-BASED POLYESTERS

FIELD OF THE INVENTION

This invention relates to multilayer films comprising a biaxially-oriented polyethylene furanoate (BO-PEF) polymer layer, wherein the BO-PEF polymer has an $O_2$ gas permeability of less than 0.25 cc-mil/100 in.$^2$ 24 hrs atm at 80% relative humidity, or a moisture permeability of less than 0.5 g-mil/100 in.$^2$ 24 hrs atm at 38° C., or both. The film may be formed from microlayers of (a) BO-PEF-based polymer and (b) polymer with a melting point of at least 5° C. greater than the melting point of the BO-PEF-based polymer. The invention further relates to articles, such as packaging made with such multi-layer films.

BACKGROUND

Polyethylene terephthalate (PET) is widely used in both flexible and rigid packaging. There is a need to provide polymer films with improved barrier properties to oxygen, carbon dioxide and moisture to accommodate increasing demands in lighter weighting of bottles, simpler designs, and longer shelf life of packaged food, including produce, meat, fish, and cheese and other dairy products. In addition, with the emphasis on technologies based on sustainable chemistry, there has been increased interest in films based on monomers from renewable sources, such as polyethylene furanoate based on furan dicarboxylic acid, which can be produced using bioderived compounds, such as fructose.

Several new polymers with high barrier properties have been developed from either renewable or non-renewable resources and some of these have already been commercialized. These include polyethylene naphthalate (PEN), polyglycolic acid (PGA), and polyethylene furanoate (PEF). For those polymers, the oxygen barrier property (at about 23° C. and 50% relative humidity) follows the order:

PGA≈EVOH>PEN≈PEF>PET

Compared to PET, PEF has been reported to have six times improved oxygen barrier, two times improved barrier to carbon dioxide, and also improved moisture barrier. "Bioplastics, Reshaping the Industry", Las Vegas, Feb. 3, 2011.

In WO 2010/077133 (Sipos, assigned to Furanix Technologies B.V.), a process for the production of PEF polymers and copolymers made from 2,5-furandicarboxylate is disclosed. The (co)polymers have a number average molecular weight of at least 10,000 (as determined by GPC based on polystyrene standards), and an absorbance below 0.05 (as a 5 mg/ml solution in a dichloromethane:hexafluoroisopropanol 8:2 mixture at 400 nm). These (co)polymers may be subjected to solid state polycondensation and then attain a number average molecular weight greater than 20,000 (as determined by GPC based on polystyrene standards), without 5 suffering from discoloration.

There remains a need for multilayer films based on cost-effective polymers that form films, preferably clear films, that exhibit a desirable balance of properties, such as improved oxygen permeability, or improved water-vapor transmission rate (WVTR), or, preferably, both.

The present invention achieves these objectives by forming a multilayer film comprising (a) a biaxially-oriented polyethylene furanoate polymer layer, (b) an optional ink layer, (c) a bonding layer, and (d) a sealant layer, wherein the BO-PEF polymer has an $O_2$ gas permeability of less than 0.25 cc-mil/100 in.$^2$ 24 hrs atm at 80% relative humidity, or a moisture permeability of less than 0.5 g-mil/100 in.$^2$ 24 hrs atm at 38° C., or both.

SUMMARY OF THE INVENTION

The present invention relates to a multilayer film comprising (a) a biaxially-oriented polyethylene furanoate (BO-PEF) polymer layer, (b) an optional ink layer, (c) a bonding layer, and (d) a sealant layer, wherein the BO-PEF polymer has an $O_2$ gas permeability of 0.25 cc-mil/100 in.$^2$ 24 hrs atm (5 cc 20 µm/m$^2$ 24 hrs atm) at 80% relative humidity (ASTM D-3985) or less, or a moisture permeability of 0.5 g-mil/100 in.$^2$ 24 hrs atm (9.8 g 20 µm/m$^2$ 24 hrs atm) at 38° C. (ASTM F-1249) or less, or both. The BO-PEF polymer may have (a) a weight average molecular weight of 20,000 to 100,000 and (b) a polydispersity index of less than 4. The bonding layer may be a laminating adhesive or a co-extruded tie-layer. The BO-PEF layer may be coated with a layer of polyvinylidene chloride (PVDC) polymer.

The present invention further relates to multilayer films wherein the BO-PEF polymer layer comprises a microlayer sequence comprising a number, n, of repeating units, each repeating unit comprising at least two microlayers, (a) and (b), wherein (a) is a first polymer with a melting point of at least 5° C. greater than the melting point of second polymer (b); and wherein second polymer (b) is a BO-PEF polymer derived from one or more monomer selected from the group consisting of 2,5-furan dicarboxylic acid (FDCA) and $C_1$ to $C_{10}$ alkyl esters thereof, wherein said monomers comprise at least 35 Mole % of the BO-PEF polymer, where the microlayer sequence is characterized by the absence of any tie layer between microlayers (a) and (b), and where the resulting structure has the formula {(a)(b)(c)}n, where (c) represents one or more optional additional layers which may be the same or different from microlayers (a) and (b), but which layer(s) (c) are not tie layers. The diacid or diester monomers used to form the BO-PEF polymer maybe entirely (100 mole %) selected from the group consisting of FDCA and $C_1$ to $C_{10}$ alkyl diesters thereof. Alternatively, the diacid or diester monomers used to form the BO-PEF polymer may comprises up to 65 mole % of 2,6-naphthalene dicarboxylic acid (NDCA), one or more $C_1$ to $C_{10}$ alkyl diester thereof, glycolide, or combinations thereof.

In the multilayer film of the present invention the sealant layer may comprise one or more layers of polyethylene (PE) polymer. The sealant layer may comprise one or more polymers selected from the group consisting of low-density polyethylene (LDPE), linear low-density polyethylene (LLDPE), very low-density polyethylene (VLDPE), ethylene vinyl acetate (EVA), and polypropylene (PP). The multilayer film may comprise one or more layers of ethylene vinyl alcohol (EVOH). When EVOH barrier layer(s) are present, the multilayer film may comprise tie layers between adjacent layers of sealant layer and EVOH layers.

The multilayer film may comprise an abuse layer. The abuse layer may be a polymer layer formed from a polymer selected from the group consisting of a polyolefin, polyethylene terephthalate and nylon.

The multilayer films have a high degree of clarity or transparency, in addition to their $O_2$ and moisture permeability properties. The multilayer films of the present invention may comprise one or more foil or metalized layer or they may contain no foil or metalized film layer. To take advantage of the clarity and transparency of the polymers, and to provide transparent packaging, the barrier films optimally contain no foil or metalized film layer.

The multilayer films of the present invention include barrier films formed from polyester-based polymer with (a) an $O_2$ gas permeability of 0.25 cc-mil/100 in.$^2$ 24 hrs atm (5 cc 20 µm/m$^2$ 24 hrs atm) at 80% relative humidity (ASTM D-3985) or less, (b) a moisture permeability of 0.5 g-mil/100 in.$^2$ 24 hrs atm (9.8 g 20 µm/m$^2$ 24 hrs atm) at 38° C. (ASTM F-1249) or less, (c) haze of 1% or less (ASTM D1003), and (d) a glass transition temperature of 100° C. or higher. These films have desirable $O_2$ and moisture permeability properties as well as a high degree clarity or transparency.

DETAILED DESCRIPTION OF THE INVENTION

The present invention provides cost-effective multilayer films based on polymers that exhibit a desirable balance of properties, relative to PEF polymers, including improved oxygen), carbon dioxide, and water-vapor transmission permeability, higher glass transition temperature (Tg), and improved chemical, heat and impact resistance. The films comprise a biaxially-oriented polyethylene furanoate (BO-PEF) polymer layer, (b) an optional ink layer, (c) a bonding layer, and (d) a sealant layer. The BO-PEF polymer has (i) an $O_2$ gas permeability of 0.25 cc-mil/100 in.$^2$ 24 hrs atm (5 cc 20 µm/m$^2$ 24 hrs atm) at 80% relative humidity (ASTM D-3985) or less, or (ii) a moisture permeability of 0.5 g-mil/100 in.$^2$ 24 hrs atm (9.8 g 20 µm/m$^2$ 24 hrs atm) at 38° C. (ASTM F-1249) or less, or (iii) both.

The BO-PEF polymer preferably has both an $O_2$ gas permeability of 0.25 cc-mil/100 in.$^2$ 24 hrs atm (5 cc 20 µm/m$^2$ 24 hrs atm) at 80% relative humidity (ASTM D-3985) or less, or (ii) a moisture permeability of 0.5 g-mil/100 in.$^2$ 24 hrs atm (9.8 g 20 µm/m$^2$ 24 hrs atm) at 38° C. (ASTM F-1249) or less. Independently, the BO-PEF polymer more preferably has an $O_2$ gas permeability of 0.2 cc-mil/100 in.$^2$ 24 hrs atm or less, or 0.1 cc-mil/100 in.$^2$ 24 hrs atm or less (4 cc 20 µm/m$^2$ 24 hrs atm or less, or 2 cc 20 µm/m$^2$ 24 hrs atm or less) at 80% relative humidity; and/or a moisture permeability of 0.4 g-mil/100 in.$^2$ 24 hrs atm or less, or 0.25 g-mil/100 in.$^2$ 24 hrs atm or less, or 0.1 g-mil/100 in.$^2$ 24 hrs atm or less (7.8 g 20 µm/m$^2$ 24 hrs atm or less, 4.9 g 20 µm/m$^2$ 24 hrs atm or less, 2 g 20 µm/m$^2$ 24 hrs atm or less).

The BO-PEF polymer may have (a) a weight average molecular weight of 20,000 to 100,000 and (b) a polydispersity index of less than 4. Preferably, the polymer has a weight average molecular weight 80,000 or less, or 50,000 or less, or 25,000 or less, or 25,000 or more, or 50,000 or more, or 80,000 or more. Preferably, the polymer has a polydispersity index of 2.2 to 2.8, or 2.4 to 2.7. The BO-PEF polymer may have any combination of molecular weight and polydispersity described herein.

The multilayer films of the present invention include barrier films formed from polyester-based polymer with (a) an $O_2$ gas permeability of 0.25 cc-mil/100 in.$^2$ 24 hrs atm (5 cc 20 µm/m$^2$ 24 hrs atm) at 80% relative humidity (ASTM D-3985) or less, (b) a moisture permeability of 0.5 g-mil/100 in.$^2$ 24 hrs atm (9.8 g 20 µm/m$^2$ 24 hrs atm) at 38° C. (ASTM F-1249) or less, (c) haze of 1% or less (ASTM D1003), and (d) a glass transition temperature of 100° C. or higher. These films have desirable $O_2$ and moisture permeability properties as well as a high degree clarity or transparency. The multilayer films comprise a biaxially-oriented polyethylene furanoate (BO-PEF) polymer layer, (b) an optional ink layer, (c) a bonding layer, and (d) a sealant layer.

The multilayer films may preferably comprise a BO-PEF polymer with independently further improved characteristics, namely: (a) an $O_2$ gas permeability of 0.2 or less, from 0.1 to 0.2, or 0.1 or less, cc-mil/100 in.$^2$ 24 hrs atm or less (4 or less, 2-4, or 2 or less, cc-20 µm/m$^2$ 24 hrs atm or less) at 50% relative humidity, (b) a moisture permeability of 0.4 or less, or 0.25 or less, or 0.2 or less g-mil/100 in.$^2$ 24 hrs atm (7.8 or less, or 4.9 or less, or 3.9 or less g-20 µm/m$^2$ 24 hrs atm) at 38° C., (c) haze of 0.8% or less or 0.5% or less, or 0.3% or less, or (d) a glass transition temperature of 100 to 150° C., or 110 to 150° C., or 120 to 150° C.

The performance properties of the multilayer film may be adjusted by varying the thickness of the BO-PEF polymer layer(s), or by the inclusion of other layers with desirable properties, for example, PVDC or PE barrier layers, metalized layers, abuse layers, or the like. The selection and use of such additional, optional, layers are within the ability of a person of skill in the art.

The multilayer films may comprise one or more foil or metalized layer or they may contain no foil or metalized film layer. The films have a high degree of clarity or transparency. To take advantage of the clarity and transparency of the polymers, and to provide transparent packaging, the multilayer films may contain no foil or metalized film layer. Using the polymers described herein, the films have sufficient oxygen and moisture permeability properties that the use of foil or metalized film layers is not necessary, even for most food and pharmaceutical applications. This enables the construction of clear or transparent packaging systems with their concomitant marketing advantages, manufacturing efficiency, and cost reduction.

The polyethylene furanoate (PEF) based polymer used in the multilayer film of the present invention is biaxially oriented, meaning that the film is drawn or stretched in the both the machine direction and the transverse direction. During manufacture, the process may begin with a film of molten PEF being extruded onto a chill roll, which quenches it into the amorphous state. It is then biaxially oriented by drawing, for example, by a sequential process, in which the film is first drawn in the machine direction using heated rollers and subsequently drawn in the transverse direction, i.e. orthogonally to the direction of travel, in a heated oven. It is also possible to draw the film in both directions simultaneously. Draw ratios are typically around 2 to 7 times, in each direction, preferably 2.5 to 4.5 times, more preferably 3 to 4 times, in each direction independently. Once the drawing is completed, the film may be "heat set" or crystallized under tension in an oven at temperatures typically above 200° C.

In addition to the BO-PEF layer(s), the multilayer film of the present invention comprises an optional ink layer, a bonding layer, and a sealant layer. The multilayer film may be formed using conventional inks, bonding layers and sealant layers as are well known in the art for use, for example, with multilayer PET-based films. The ink(s), when present, may be water-based or solvent-based inks. The bonding layer may be film, for example, a co-extruded film layer, or it may be a solvent-based, or solventless (100% solids), or water-based laminating adhesive, for example, a polyurethane-, polyester- or acrylate-based laminating adhesive.

In the multilayer film of the present invention the sealant layer may comprise one or more layers of polyethylene (PE) polymer. The sealant layer may comprise one or more polymers selected from the group consisting of low-density polyethylene (LDPE), linear low-density polyethylene (LL-DPE), very low-density polyethylene (VLDPE), ethylene vinyl acetate (EVA), and polypropylene (PP). The multilayer film may comprise one or more layers of ethylene vinyl alcohol (EVOH). When EVOH barrier layer(s) are present, the multilayer film may comprise tie layers between adjacent layers of sealant layer and EVOH layers.

The multilayer film may comprise an abuse layer. The abuse layer may be a polymer layer formed from one or more polymers selected from the group consisting of a polyolefin, polyethylene terephthalate and nylon.

Optionally, and in all the variants described herein, the BO-PEF layer may be coated with a layer of polyvinylidene chloride (PVDC) polymer. The PVDC layer can further augment the barrier properties of the multilayer film. The methods for applying PVDC and the desired thickness of any PVDC layer(s) are well known to persons of ordinary skill in the art.

The present invention further relates to multilayer films wherein the BO-PEF polymer layer comprises a microlayer sequence comprising a number, n, of repeating units, each repeating unit comprising at least two microlayers, (a) and (b), wherein (a) is a first polymer with a solidification temperature of at least 5° C. greater than the crystallization temperature of second polymer (b); and wherein second polymer (b) is a BO-PEF polymer derived from one or more monomer selected from the group consisting of 2,5-furan dicarboxylic acid (FDCA) and $C_1$ to $C_{10}$ alkyl esters thereof, wherein said monomers comprise at least 35 mole % of the BO-PEF polymer, where the microlayer sequence is characterized by the absence of any tie layer between microlayers (a) and (b), and where the resulting structure has the formula {(a)(b)(c)}n, where (c) represents one or more optional additional layers which may be the same or different from microlayers (a) and (b), but which layer(s) (c) are not tie layers. The diacid or diester monomers used to form the BO-PEF polymer maybe entirely (100 mole %) selected from the group consisting of FDCA and $C_1$ to $C_{10}$ alkyl diesters thereof. Alternatively, the diacid or diester monomers used to form the BO-PEF polymer may comprises up to 65 mole % of 2,6-naphthalene dicarboxylic acid (NDCA), one or more $C_1$ to $C_{10}$ alkyl diester thereof, glycolide, or combinations thereof.

Polymers suitable for use as the first polymer which have a solidification temperature at least 5° C. greater than the crystallization temperature of the PO-PEF polymer comprise polyethylene terephthalate (PET), polyethylene naphthalate (PEN), polycarbonate, MXD6 nylon, nylon 6, and isotactic polypropylene.

Methods of forming films by means of a series of microlayers are known in the art. Such methods are directly applicable to forming barrier films based on microlayers where the microlayers comprise (i) BO-PEF polymer layers derived from one or more monomer selected from the group consisting of FDCA and $C_1$ to $C_{10}$ alkyl esters thereof, wherein said monomers comprise at least 35 mole % of the BO-PEF polymer, and (ii) layers of first polymer with a melting point of at least 5° C. greater than the melting point of the BO-PEF polymer. A description of the process may be found in Baer et al., US patent publication no. US2010/0143709, and in references cited therein and which cite Baer et al.

The multilayer films of the present invention may be formed from BO-PEF polymers which comprise the reaction product of (a) one or more diacid or diester thereof and (b) one or more polyol, wherein component (a) comprises 5 to 100 mole %, based on the total amount of component (a), of 2,5-furan dicarboxylic acid (FDCA), one or more $C_1$ to $C_{10}$ alkyl diester thereof, or combinations thereof, and component (b) comprises ethylene glycol, a mixture of 1,3-cyclohexane dimethanol and 1,4-cyclohexane dimethanol, or 2,2,4,4-tetramethyl-1,3-cyclobutanediol, or combinations thereof. Component (a) may comprise dimethyl furanoate (DMF), the $C_1$ alkyl diester of FDCA.

The polymers used to form the barrier film may be formed from 100% FDCA or DMF and some amount of a mixture of 1,3- and 1,4-cyclohexanedimethanol, or 2,2,4,4-tetramethyl-1,3-cyclobutanediol, or combinations thereof.

It can be desirable to prepare the polymers with FDCA or DMF and other diacids or diesters. When component (a) (diacid or diester) is less than 100 mole % FDCA or DMF, the polymer may be formed from FDCA or DMF and 0.1 to 95 mole %, based on the total amount of component (a), of 2,6-naphthalene dicarboxylic acid (NDCA) or one or more $C_1$ to $C_{10}$ alkyl diester thereof. One suitable diester of NDCA is dimethyl naphthanoate (DMN). For example, the polymer may be formed from diacids comprising 10 to 90 mole % of FDCA and 10 to 90 mole % of NDCA, based on the total amount of component (a). As another example, the polymer may be formed from diesters comprising 10 to 90 mole % of one or more $C_1$ to $C_{10}$ alkyl diester of FDCA, such as DMF, and 10 to 90 mole % of one or more $C_1$ to $C_{10}$ alkyl diester of NDCA, such as DMN, based on the total amount of component (a).

Preferably, the component (a) diacid(s) or diester(s) is made up exclusively of diacid(s) or diester(s), respectively. These may be combinations of FDCA and only other diacids, or DMF and only other diesters. However, component (a) may also comprise a mixture of diacid(s) and diester(s). When component (a) has a mixture of diacid(s) and diester(s), the alternate (non-predominant) form is preferably present at relatively low amounts, for example, 20 or 10, or 5, or 1, or 0.5, or 0.1 mole % based on the total amount of component (a). For example, component (a) may comprise 90 mole % DMN and 10 mole % NDCA. As component (a) may comprise a mixture of diacids or diesters, the alternate form diester(s) or diacid(s), respectively, may also be a mixture and are not necessarily the counterpart diacid or diester. For example, component (a) may comprise a predominant amount of DMN and DMF with a smaller amount of FDCA; or as another example, component (a) may comprise a predominant amount of DMF with a smaller amount of NDCA.

The polyol, component (b), comprises a mixture of 1,3-cyclohexanedimethanol and 1,4-cyclohexanedimethanol, or 2,2,4,4-tetramethyl-1,3-cyclobutanediol, or combinations thereof. Component (b) may further comprise 10 to 90 mole %, based on the total amount of component (b) polyol, of ethylene glycol. Component (b) may also comprise other polyols based on cyclic, acyclic or aromatic alcohols.

When component (b) comprises a mixture of 1,3- and 1,4-cyclohexanedimethanol, it may comprise 25 to 75 mole %, based on the total amount of component (b), of 1,3-cyclohexanedimethanol and 25 to 75 mole %, based on the total amount of component (b), of 1,4-cyclohexanedimethanol. As an example, component (b) may comprise 45 to 65 mole %, based on the total amount of component (b), of 1,3-cyclohexanedimethanol and 35 to 55 mole %, based on the total amount of component (b), of 1,4-cyclohexanedimethanol. As a further example, component (b) may comprise 55 mole %, based on the total amount of component (b), of 1,3-cyclohexanedimethanol and 45 mole %, based on the total amount of component (b), of 1,4-cyclohexanedimethanol. Commercially available product contains the 1,3- and 1,4-compounds within those ratios.

Component (b) may comprise 2,2,4,4-tetramethyl-1,3-cyclobutanediol alone, or in combination with 1,3- and 1,4-cyclohexanedimethanol or ethylene glycol or other polyols. It is also possible for ethylene glycol to be the primary polyol used as component (b).

Within the scope of the invention are also multilayer films which comprise polyester-based polymers that comprise the reaction product of (a) one or more diacid or ester thereof and (b) one or more polyol, wherein component (a) comprises (i) NDCA, $C_1$ to $C_{10}$ alkyl diester thereof, glycolide or combinations thereof, and (ii) FDCA, one or more $C_2$ to $C_{10}$ alkyl diester thereof, or combinations thereof, and component (b) comprises (i) isosorbide and (ii) optionally one more diol selected from the group consisting of ethylene glycol, mixtures of 1,3-cyclohexane dimethanol and 1,4-cyclohexane dimethanol, 2,2,4,4-tetramethyl-1,3-cyclobutanediol, and combinations thereof. Suitable compounds useful as component (a) include diethyl furanoate (DEF), DMN and glycolide. When component (b) comprises a mixture of 1,3- and 1,4-cyclohexanedimethanol, the mi which comprises 25 to 75 mole %, based on the total amount of the mixture, of 1,3-cyclohexanedimethanol and 25 to 75 mole %, based on the total amount of the mixture, of 1,4-cyclohexanedimethanol.

In this multilayer film, component (a) used to form the PEF-based polymer comprises less than 100% of FDCA and/or $C_2$ to $C_{10}$ alkyl diesters thereof. The polymer may be formed from FDCA or DEF and 0.1 to 95 mole %, based on the total amount of component (a), of NDCA or one or more $C_1$ to $C_{10}$ alkyl diester thereof. One suitable diester of NDCA is DMN. For example, the polymer may be formed from diacids comprising 10 to 90 mole % of FDCA and 10 to 90 mole % of NDCA, based on the total amount of component (a). As another example, the polymer may be formed from diesters comprising 10 to 90 mole % of one or more $C_2$ to $C_{10}$ alkyl diester of FDCA, such as DEF, and 10 to 90 mole % of one or more $C_1$ to $C_{10}$ alkyl diester of NDCA, such as DMN, based on the total amount of component (a).

In this multilayer film, component (b) may consist of, or consist essentially of, isosorbide, or alternatively may comprise isosorbide and other polyols. Other polyols suitable for use as component (b) may include ethylene glycol, mixtures of 1,3-cyclohexane dimethanol and 1,4-cyclohexane dimethanol, 2,2,4,4-tetramethyl-1,3-cyclobutanediol, and combinations thereof.

As noted above, when the BO-PEF polymer layer is formed as a microlayer structure, the PEF polymer is formed from at least 35 mole % of FDCA or its $C_1$ to $C_{10}$ alkyl diesters relative to the total amount of diacid or diester used to form the PEF polymer. The balance of diacid or diester, up to 65 mole %, may be selected from NDCA, $C_1$ to $C_{10}$ alkyl diesters thereof, or glycolide, or combinations thereof. The polyol(s) used may comprise ethylene glycol, a mixture of 1,3-cyclohexane dimethanol and 1,4-cyclohexane dimethanol, or 2,2,4,4-tetramethyl-1,3-cyclobutanediol, or combinations thereof, isosorbide or other polyols.

The terms "FDCA-based polymer" and "FDCA/NDCA-based polymer" refer to polymers made from either the diacids or the diesters, and refer to polymers made from FDCA itself or DMF, DEF, or other diesters of FDCA and other diacids or diesters as described herein (not just NDCA or DMN). As described herein, such FDCA-based polymers and FDCA/NDCA-based polymers may comprise residues of other diacids and diesters as well. These are PEF polymers used to form the BO-PEF polymers for use in the present invention.

The FDCA-based and FDCA/NDCA-based polymers used to form the multilayer films of the present invention have a glass transition temperature (Tg) of at least 100° C.

as measured by differential scanning calorimetry (DSC) or calculated according to the Fox Equation (see, T. G. Fox, Bull. Am. Physics Soc., vol. 1(3), p. 123 (1956)). Preferably, the Tg of the polymers is in the range from 100 to 150° C., or 110 to 150° C., or 120 to 150° C. Polymers with Tg of 100° C. or higher, and preferably 120° C. or higher, and the films, sheets and articles made from them, exhibit desirable physical characteristics as described elsewhere herein.

The polymers and copolymers described above which are used to form the barrier films of the present invention may be prepared by known methods. WO 2010/0177133, referenced above, teaches methods to make these polyesters, and produce them at high molecular weights and without discoloration. The method of WO 2010/0177133 is applicable to preparing the present polymers using FDCA, DMF or DEF alone or together with suitable amounts of NDCA or DMN or $C_2$ to $C_{10}$ alkyl diesters of FDCA and/or NDCA.

For example, the polymers useful in the barrier films of the present invention may be made by a two-step process, wherein first, in Step (I), a prepolymer is made having furan dicarboxylate and/or naphthalene dicarboxylate moieties within the polymer backbone. This intermediate product is preferably an ester composed of two diol monomers and one diacid monomer, wherein at least part of the diacid monomers comprises FDCA or FDCA and NDCA, followed by a melt-polymerization of the prepolymers under suitable polymerization conditions. Such conditions typically involve reduced pressure to remove the excess of diol monomers. Using DMF as an example of the diester (though applicable to DEF as well), in Step (I) DMF is reacted in a catalyzed transesterification process with about 2 equivalents of a diol, to generate the prepolymer while removing 2 equivalents of the corresponding alcohol. DMF is preferred, since this transesterification step then generates methanol, a volatile alcohol that is easy to remove. However, as starting material diesters of FDCA with other volatile alcohols or phenols (e.g., having a boiling point at atmospheric pressure of less than 150° C., preferably less than 100° C., more preferably of less than 80° C.) may be used as well. Examples, therefore, include ethanol, methanol and a mixture of ethanol and methanol. The reaction leads to formation of a polyester. As discussed in more detail below, the diol monomers may contain additional hydroxyl groups, such as glycerol, pentaerythritol or sugar alcohols.

Step (I) is commonly referred to as esterification when acid is used, and transesterification when ester is used, with concomitant removal of water or an alcohol, respectively. Step (II) of the process is a catalyzed polycondensation step, wherein the prepolymer is polycondensed under reduced pressure, at an elevated temperature and in the presence of a suitable catalyst.

The first step, transesterification, is catalyzed by a specific transesterification catalyst at a temperature preferably in the range of about 150 to about 220° C., more preferably in the range of about 180 to about 200° C., and carried out until the starting ester content is reduced until it reaches the range of about 3 mole % to about 1 mole %. The transesterification catalyst may be removed, to avoid interaction in the second step of polycondensation, but often remains present for the second step. The selection of the transesterification catalyst can be affected by the selection of the catalyst used in the polycondensation step, and vice versa.

Suitable catalysts for use in the Step (I) transesterification process include tin(IV) based catalysts, preferably organotin (IV) based catalysts, more preferably alkyltin(IV) salts including monoalkyltin(IV) salts, dialkyl and trialkyltin(IV)

salts and mixtures thereof. The tin(IV) based catalysts are better than tin(II) based catalysts, such as tin(II) octoate.

The tin(IV) based catalysts may also be used with alternative or additional transesterification catalysts. Examples of alternative or additional transesterification catalysts that may be used in Step (I) include one or more of titanium(IV) alkoxides or titanium(IV) chelates, zirconium(IV) chelates, or zirconium(IV) salts (e.g. alkoxides); hafnium(IV) chelates or hafnium(IV) salts (e.g. alkoxides). Although these alternative or additional catalysts may be suitable for the transesterification, they may actually interfere during the polycondensation step. Therefore, preferably, the main or sole transesterification catalyst is a tin(IV) based catalyst. Alternatively, when alternative or additional catalysts are used, they are removed after Step (I) and before Step (II).

Preferred transesterification catalysts are selected from one or more of, butyltin(IV) tris(octoate), dibutyltin(IV) di(octoate), dibutyltin(IV) diacetate, dibutyltin(IV) laureate, bis(dibutylchlorotin(IV)) oxide, dibutyltin dichloride, tributyltin(IV) benzoate and dibutyltin oxide.

In respect to the catalyst, it should be realized that the active catalyst as present during the reaction may be different from the catalyst as added to the reaction mixture. The catalysts are used in an amount of about 0.01 to about 0.2 mole % relative to initial diester, more preferably in an amount of about 0.04 to about 0.16 mole % of initial diester.

The intermediate product (i.e., the prepolymer) may, but importantly need not be isolated and/or purified. Preferably, the product is used as such in the subsequent polycondensation step. In this catalyzed polycondensation step, the prepolymer is polycondensed under reduced pressure, at an elevated temperature and in the presence of a suitable catalyst. The temperature is preferably in the range of about the melting point of the polymer to about 30° C. above this melting point, but preferably not less than about 180° C. The pressure should be reduced, preferably gradually at stages. It should preferably be reduced to as low as a pressure as possible, more preferably below 1 mbar. Step (II) is catalyzed by specific polycondensation catalysts and the reaction is carried out at mild melt conditions.

Examples of suitable polycondensation catalysts for use in Step (II) include tin(II) salts, such as tin(II) oxide, tin(II) dioctoate, butyltin(II) octoate, or tin(II) oxalate. Preferred catalysts are tin(II) salts obtained by the reduction of the tin(IV) catalyst, e.g., alkyltin(IV), dialkyltin(IV), or trialkyltin(IV) salts, used as transesterification catalyst in Step (I), with a reducing compound. Reducing compounds used may be well-known reducing compounds, preferably phosphorus compounds.

Particularly preferred reducing compounds are organophosphorus compounds of trivalent phosphorus, in particular a monoalkyl or dialkyl phosphinate, a phosphonite or a phosphite. Examples of suitable phosphorus compounds are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, di(2,4-di-tert-butylphenyl) pentaerythritol diphosphite, tristearylsorbitol triphosphite, tetrakis(2,4-di-tert-butylphenyl) 4,4'-diphenylenediphosphonite, 4,4'-isopropylidenediphenol $C_{12-15}$alkyl phosphite, poly(dipropylene glycol) phenyl phosphite, tetraphenyl dipropylene glycol phosphite, tetraphenyl diisopropylene glycol phosphite, trisisodecyl phosphite, diisodecyi-phenyl phosphite, diphenyl isodecyl phosphite, and mixtures thereof.

The preferred polycondensation catalysts therefore include tin(II) salts such as tin(II) dioctoate, butyl(II) octoate and other alkyltin(II) octoate compounds, prepared from the corresponding tin(IV) salt using e.g., a trialkyl phosphite, a monoalkyl diaryl phosphite, a dialkyl monoaryl phosphite or a triaryl phosphite. Preferably, the reducing compound is added in the melt of the prepolymer. Addition of the reducing compound at that stage avoids discoloration.

A combination of transesterification catalyst and polycondensation catalyst that may be particularly suitable, is based on a tin(IV) type catalyst during transesterification, which is reduced, preferably with triphenylphosphite and/or tris(nonylphenyl)phosphite, to a tin(II) type catalyst during the polycondensation. The catalysts are used in an amount of about 0.01 to about 0.2 mole % relative to initial diester, more preferably in an amount of about 0.04 to about 0.16 mole % of initial diester.

It is particularly useful that the combination of tin(IV) type catalyst and tin(II) type catalyst retains activity. This allows for the same catalyst to be used for a subsequent solid state polycondensation. Solid state polycondensation (SSP) is a common process used in the preparation of other polyesters, such as PET. In SSP processes, pellets, granules, chips or flakes of polymer are subjected for a certain amount of time to elevated temperatures (below melting point) in a hopper, a tumbling drier or a vertical tube reactor or the like. With tin(IV)/tin(II) catalyst systems, higher molecular weight can be reached than with titanium catalysts. Tin type catalysts allow SSP of the FDCA- or FDCA/NDCA-based polymers to reach a number average molecular weight of 20,000 and greater. Conditions and equipment for SSP are known, in particular as SSP is frequently used to upgrade recycled PET. In applying the SSP process to these polymer systems, the temperature should be elevated relative to traditional SSP processes (as for PET), but nonetheless remain below, and preferably well below, the melting point of the polymer.

Polyesters and various copolymers may be made according to the process described above, depending on the selection of the monomers used. Furthermore, the copolymers may be formed as random or block copolymers depending on the process and process conditions employed. For instance, linear polyesters may be made with FDCA (in the form of its methyl ester) and an aromatic, aliphatic or cycloaliphatic diol. The $C_1$ (or $C_2$) to $C_{10}$ alkyl diester of FDCA may be used in combination with one or more other dicarboxylic acid esters or lactones. Likewise, the diol may be a combination of two or more diols.

Polyesters that have never been produced before and that are useful in forming the barrier films claimed in this application include those having both a 2,5-furan dicarboxylate moiety within the polymer backbone, as well as a 1,3- and 1,4-cyclohexanedimethanol (either of the stereoisomers or a mixture thereof), or 2,2,4,4-tetramethyl-1,3-cyclobutanediol, or combinations thereof, within the polymer backbone.

The polymers and copolymers used to form the multilayer films according to the current invention need not be linear. If a polyfunctional aromatic, aliphatic or cycloaliphatic alcohol is used, or part of the diol is replaced by such a polyol, then a branched or even crosslinked polymer may be obtained. A branched or crosslinked polymer may also be obtained when part of the FDCA ester or NDCA ester is replaced by an ester of a polyacid. However, branching would reduce barrier properties, and too much crosslinking would impair film processability. As a result, the polymers should have only a moderate degree of branching or crosslinking, or little to essentially no branching or crosslinking, and preferably have no branching or crosslinking. The use of linear polymer and copolymer are preferred.

The diacids and diesters used in the present invention may be FDCA and the $C_1$ (or $C_2$) to $C_{10}$ alkyl diesters of FDCA, or they may comprise FDCA and its diesters, and further comprise NDCA and its $C_1$ to $C_{10}$ alkyl diesters. The polymer may be made with up to 100 mole % of the diacid or diester being FDCA or DMF (or DEF), or it may be made with as little as 5 mole % of FDCA or DMF (or DEF). The diacid or diester used to make the polymer may comprise 0.1 to 95 mole % NDCA or DMN and at least 5 mole % of FDCA or DMF (or DEF). Preferably, the diacid or diester comprises 10-90 mole % FDCA or DMF and 10-90 mole % NDCA or DMN; more preferably 70-80 mole % FDCA or DMF and 20-30 mole % NDCA or DMN.

Other diacids, diesters, lactones or lactides may be present as well. Suitable di- or polycarboxylic acid esters which can be used in combination with the DMF or in combination with DMF and DMN include dimethyl terephthalate, dimethyl isophthalate, dimethyl adipate, dimethyl azelate, dimethyl sebacate, dimethyl dodecanoate, dimethyl 1,4-cyclohexane dicarboxylate, dimethyl maleate, dimethyl succinate, and trimethyl 1,3,5-benzenetricarboxylate.

Preferred examples of dicarboxylic acid esters or polycarboxylic acid esters to be used in combination with the DMF (and/or DEF) or in combination with DMF (and/or DEF) and DMN are dimethyl terephthalate, dimethyl adipate, dimethyl maleate, and dimethyl succinate. More preferably, these may be present in a molar ratio of about 10:1 to about 1:10 vis-à-vis the DMF (or DEF) or the combination of DMF (or DEF) and DMN. This mixture of reactants may be referred to as the acid ester reactant.

Preferred examples of lactones to be used in combination with the DMF (or DEF) or in combination with DMF (or DEF) and DMN are pivalolactone, ϵ-caprolactone and lactides (L,L; D,D; D,L) and glycolide The polymers useful in forming the barrier films of the present invention are made using polyols which may comprise a mixture of 1,3-cyclohexanedimethanol and 1,4-cyclohexanedimethanol, or 2,2,4,4-tetramethyl-1,3-cyclobutanediol, or combinations thereof. When the polyol is only mixtures of 1,3- and 1,4-cyclohexanedimethanol, or when the polyol comprises mixtures of 1,3- and 1,4-cyclohexanedimethanol, the polyol preferably comprises 25 to 75 mole % of 1,3-cyclohexanedimethanol and 25 to 75 mole % of 1,4-cyclohexanedimethanol, based on the total amount of polyol; more preferably, 45 to 65 mole % of 1,3-cyclohexanedimethanol and 35 to 55 mole % of 1,4-cyclohexanedimethanol, based on the total amount of polyol; and still more preferably, 55 mole % of 1,3-cyclohexanedimethanol and 45 mole of 1,4-cyclohexanedimethanol, based on the total amount of polyol.

The 1,3- and 1,4-cyclohexanedimethanol generally comprise a mixture of cis- and trans-forms of the molecule. Preferably, both the 1,3-cyclohexanedimethanol and 1,4-cyclohexanedimethanol independently comprise 35 mole % cis- and 65 mole % trans-forms of the molecules.

The polyol used to form the polymers of the present invention may comprises 2,2,4,4-tetramethyl-1,3-cyclobutanediol alone, or in combination with a mixture of 1,3-cyclohexanedimethanol and 1,4-cyclohexanedimethanol, or in combination with other polyol(s).

Examples of suitable polyol monomers which may be used together with mixtures of 1,3-cyclohexanedimethanol and 1,4-cyclohexanedimethanol, or 2,2,4,4-tetramethyl-1,3-cyclobutanediol alone, or combinations of the foregoing, include ethylene glycol, diethylene glycol, 1,2-propanediol, 1,3-propanediol, 1,4-butanediol, 1,5-pentanediol, 1,6-hexanediol, 1,4-benzenedimethanol, 2,2-dimethyl-1,3-propanediol, poly(ethylene glycol), poly(tetrahydofuran), 2,5-di(hydroxymethyl) tetrahydrofuran, isosorbide, glycerol, pentaerythritol, sorbitol, mannitol, erythritol, and threitol. Among those additional polyols which may be used to form the polymers of the present invention (other than mixture of 1,3-cyclohexanedimethanol and 1,4-cyclohexanedimethanol, or 2,2,4,4-tetramethyl-1,3-cyclobutanediol, or combinations thereof), preferred are ethylene glycol, 1,3-propanediol, 1,4-butanediol, 1,6-hexanediol, 2,2-dimethyl-1,3-propanediol, poly(ethylene glycol), and poly (tetrahydofuran).

The FDCA- and FDCA/NDCA-based polymers made by the processes described above, or by other known processes for the preparation of polyesters, can be combined to form novel, useful compositions. The novel polymers may be combined with alternate novel polymers, or with known polyesters, or with both alternate novel polymers and known polyesters. The present invention includes barrier films based on polymer compositions comprising (1) a first polymer comprising reaction product of (a) one or more diacid or diester thereof, and (b) one or more polyol, wherein component (a) comprises 5 to 100 mole %, or 35 to 100 mole %, based on the total amount of component (a), of FDCA, or one or more $C_1$ to $C_{10}$ alkyl diester thereof, and component (b) comprises a mixture of 1,3-cyclohexanedimethanol and 1,4-cyclohexanedimethanol, or 2,2,4,4-tetramethyl-1,3-cyclobutanediol, or combinations thereof; and (2) one or more second polymer selected from the group consisting of polymers of (1) above different from the first polymer and other polyesters which are reaction product of (i) acids or esters and (ii) polyols, wherein (x) the acids and esters do not include FDCA, $C_1$ to $C_{10}$ alkyl diester thereof, or combinations thereof, when the polyol is a mixture of 1,3-cyclohexanedimethanol and 1,4-cyclohexanedimethanol, or 2,2,4,4-tetramethyl-1,3-cyclobutanediol, or combinations thereof, and (y) wherein the polyols do not include a mixture of 1,3-cyclohexanedimethanol and 1,4-cyclohexanedimethanol, or 2,2,4,4-tetramethyl-1,3-cyclobutanediol, or combinations thereof when the acids and esters are selected from the group consisting of FDCA, $C_1$ to $C_{10}$ alkyl alkyl diester thereof, or combinations thereof. Preferably, this composition comprises two or more polymers, wherein at least one polymer is the reaction product of a diacid and at least one other polymer is the reaction product of a diester.

The present invention further includes multilayers films based on polymer compositions comprising (1) a first polymer comprising reaction product of (a) one or more diacid or diester thereof, and (b) one or more polyol, wherein component (a) comprises (i) NDCA, $C_1$ to $C_{10}$ alkyl diester thereof, glycolide or combinations thereof, and (ii) FDCA, one or more $C_2$ to $C_{10}$ alkyl diester thereof, or combinations thereof, and component (b) comprises (i) isosorbide and (ii) optionally one more diol selected from the group consisting of ethylene glycol, mixtures of 1,3-cyclohexane dimethanol and 1,4-cyclohexane dimethanol, 2,2,4,4-tetramethyl-1,3-cyclobutanediol, and combinations thereof; and (2) one or more second polymer selected from the group consisting of polymers of (1) above different from the first polymer and other polyesters which are reaction product of (i) acids or esters and (ii) polyols, wherein (x) the acids and esters do not include a combination of FDCA, $C_2$ to $C_{10}$ alkyl diester thereof, or combinations thereof, together with NDCA, $C_1$ to $C_{10}$ alkyl diester thereof, glycolide or combinations thereof, when the polyol contains isosorbide, and (y) wherein the polyols do not include isosorbide when the acids and esters are selected from the group consisting of combination of FDCA, $C_2$ to $C_{10}$ alkyl diester thereof, or combinations thereof, together with NDCA, $C_1$ to $C_{10}$ alkyl diester thereof, glycolide or combinations thereof. Preferably, this composition comprises two or more polymers, wherein at least one polymer is the reaction product of a diacid and at least one other polymer is the reaction product of a diester.

The compositions may comprise one or more other polyester comprising a reaction product of component (i) glycolide, and component (ii) one or more polyol comprising a mixture of 1,3- and 1,4-cyclohexanedimethanol, or 2,2,4,4-tetramethyl-1,3-cyclobutanediol, or combinations thereof. Since the polyol component contains a mixture of 1,3- and 1,4-cyclohexanedimethanol, or 2,2,4,4-tetramethyl-1,3-cyclobutanediol, it cannot be solely ethylene glycol.

The other polyester used in forming the compositions may be one or more known polyesters, conventional or otherwise, including, but not limited to, aliphatic homopolymer polyglycolide (also known as "polyglycolic acid") (PGA), polylactide (also known as "polylactic acid") (PLA), polycaprolactone (PCL), copolymer polyethylene adipate (PEA), polyhydroxyalkanoate (PHA), polyethylene terephthalate (PET), semi-aromatic copolymer PET, polybutylene terephthalate (PBT), polytrimethylene terephthalate (PTT), polyethylene naphthalate (PEN), and aromatic copolymers from polycondensation of 4-hydroxybenzoic acid and 6-hydroxynaphthalene-2-carboxylic acid.

The invention further includes articles comprising the multilayer films made from one or more polyester-based polymers as described above, or compositions containing them. The polymers and compositions containing the polymers may contain other components such as plasticizers, softeners, dyes, pigments, antioxidants, stabilizers, fillers and the like. Examples of articles include, but are not limited to, thermoformed articles, film, shrink label, retortable packaging, pipe, bottle, profile, molded article, extruded article, fiber, and fabric. The polymers may be used in forms of application where currently PET, or PEF, or similar polyesters are used. Preferably, the articles are clear or transparent (haze of 1% or less (ASTM D1003)) packaging films, which may be used, for example, for the packaging of fresh produce (fresh fruits and vegetable) or pharmaceutical products.

The BO-PEF polymers used to form the multilayer films of the present invention may be formed by a method comprising the steps of (i) extruding one or more polymer to form an extrudate; (ii) shaping the extrudate by passing it through a flat or annular die; and (iii) cooling the extrudate to form a film or sheet having a machine direction and a cross direction; wherein one or more of the polymers used to form the extrudate is polyester-based polymer(s) as described above. The method may comprise the further step of orienting the film or sheet in the machine or cross direction, or both. The polymer resin may be processed according to standard processes applicable to other polyesters such as PET and PEF. The resulting film or sheet is oriented in both the machine and cross directions; such orientation may be imparted sequentially or simultaneously. The BO-PEF film thickness typically ranges from 1 μm to 350 μm.

The multilayer films of the present invention further include films or sheets of one or more layers, wherein at least one layer comprises FDCA polyester-based polymer(s) as described above. Such multilayer films may be prepared according to standard processes applicable to other polyesters such as PET and PEF. The films further comprise bonding layer(s), sealing layer(s) and optionally ink layer(s).

The invention includes multilayer film formed from BO-PEF polymers described above wherein the film comprises a microlayer sequence comprising a number, n, of repeating units, each repeating unit comprising at least two microlayers, (a) and (b), wherein microlayer (a) is a first polymer with a melting point of at least 5° C. greater than the melting point of second polymer (b); and wherein second polymer (b) is a BO-PEF polymer formed from one or more diacid or diester monomers selected from the group consisting of FDCA and $C_1$ to $C_{10}$ alkyl diesters thereof, wherein said monomers comprise at least 35 mole % of the diacid or diester used to form the BO-PEF polymer; where the microlayer sequence is characterized by the absence of any tie layer between microlayers (a) and (b), such that the resulting structure has the formula $\{(a)(b)(c)\}n$, where (c) represents one or more optional additional microlayers which may be the same or different from layers a and b, but which are not tie layers, and which layer(s) (c) may not be present in every repeating unit.

Methods of forming films by means of a series of microlayers are known in the art. Such methods are directly applicable to forming barrier films based on microlayers where the microlayers comprise layers derived solely from one or more α-olefinic monomers which form polyolefins, and layers of the polyester-based polymers described herein. A description of the process may be found in Baer et al., US patent publication no. US2010/0143709, and in references cited therein and which cite Baer et al.

The multilayer films of the present invention exhibit a desirable balance of properties, relative to multilayer films based on PET and other conventional polymers, including improved oxygen, carbon dioxide, and water-vapor transmission permeabilities, higher glass transition temperature (Tg), and improved chemical, heat and impact resistance.

These multilayer films may be used for various applications which benefit from the combination of properties described above, such as shrink labels, bottles for beverages and other fluids, high-barrier film applications for conventional (i.e., for use in less demanding applications than retort) and retortable packaging, hot-fill packaging, and high-heat (i.e., dry heat) applications, such as oven-proof packaging. These films and resins can be used to form packaging for applications generally served by PET films without the need for additional barriers layers needed with PET-based systems. With respect to the PO-PEF portion of the multilayer film, at similar thicknesses as PET food packaging films, the films of the present invention can be used for long shelf-life packaging for food products and pharmaceuticals, or alternatively can be used at down-gauged levels for food packaging and pharmaceuticals with performance comparable to conventional (but thicker) PET-based systems. These films and resins can be used to form transparent packaging that can provide UV-blocking for food, pharmaceutical and other applications.

The multilayer film material can also be used in tape applications, such as the carrier for magnetic tape or backing for pressure sensitive adhesive tapes, for packaging trays and blister packs. The multilayer film material can also be used as substrate in thin film and solar cell applications.

The multilayer film material may be formed into injection molded articles, extruded sheets, profile extruded articles and extruded blow molded articles. The barrier films may be used in applications including, but not limited to, medical packaging, shrink labels, rigid laminates (e.g., for furniture), transaction cards (e.g., credit cards), bottles (including so-called clear handleware), housewares, appliances, equipment, and signage.

Multilayer films of the present invention can be used to form packaging systems. Because of the high barrier properties (vis-à-vis oxygen, $CO_2$ and moisture), such multilayer systems can be made without metal foil or metalized polymeric film layers. This enables the construction of transparent or substantially transparent packaging films, a desirable opportunity for marketing food and other products. For example, the inventive multilayer films may comprise a BO-PEF polymer with (a) an $O_2$ gas permeability of 0.25 cc-mil/100 in.$^2$ 24 hrs atm (5 cc 20 μm/m$^2$ 24 hrs atm) at 50% relative humidity (ASTM D-3985) or less, (b) a moisture permeability of 0.5 g mil/100 in.$^2$ 24 hrs atm (9.8 g 20 μm/m$^2$ 24 hrs) at 38° C. (ASTM F-1249) or less, or both. The BO-PEF polymer may have (a) a weight average molecular weight of 20,000 to 100,000 and (b) a polydispersity index of less than 4.

The multilayer films of the present invention include barrier films formed from BO-PEF polymers with (a) an $O_2$ gas permeability of 0.25 cc-mil/100 in.$^2$ 24 hrs atm (5 cc 20 μm/m$^2$ 24 hrs atm) at 80% relative humidity (ASTM D-3985) or less, (b) a moisture permeability of 0.5 g-mil/100 in.$^2$ atm (9.8 g 20 μm/m$^2$ 24 hrs atm) at 38° C. (ASTM F-1249) or less, (c) haze of 1% or less (ASTM D1003), and (d) a glass transition temperature of 100° C. or higher.

The BO-PEF polymer layer used in the multilayer film may further have (x) a Falling dart drop impact (Type A) of 200 g for a 50 μm thick film material at room temperature and 50% relative humidity (ASTM D-1709) or greater, (y) an Elmendorf tear of 400 g for a 50 μm thick film material at room temperature and 50% relative humidity (ASTM D-1922) or greater, or (z) a notched Izod impact of 1.0 J/cm at room temperature and 50% relative humidity (ASTM D-256 for rigid materials) or greater, or combinations thereof. Preferably, the film layer has properties (a), (b), (c) and (d), and one or more of properties (x), (y) and (z). Such polymers are particularly suitable for food, industrial, consumer, pharmaceutical, medical, and electronic and electronic component packaging applications.

The BO-PEF polymer layer used in the multilayer film may preferably have (x) a Falling dart drop impact (Type A) of 250 or greater, or 300 or greater, or 500 g or greater for a 50 μm thick film material at room temperature and 50% relative humidity, (y) an Elmendorf tear of 450 or greater, 500 or greater, or 600 g or greater at room temperature and 50% relative humidity, or (z) a notched Izod impact of 1.5 or greater, or 2.0 or greater, or 2.5 or greater, or 3.0 J/cm or greater at room temperature and 50% relative humidity, or combinations of (x), (y) and (z).

Each of the various figures for the barrier, Tg and toughness properties described in the preceding three paragraphs may be independently combined to describe films within the scope of the present invention. Merely as an illustration of that point, as one example, the BO-PEF polymer layer used in the multilayer film of the present invention may comprise a polyester-based polymer with (a) an $O_2$ gas permeability of 2.5 cc-mil/100 in.$^2$ 24 hrs atm (5 cc 20 μm/m$^2$ 24 hrs atm) or less at 50% relative humidity, (b) a moisture permeability of 0.5 g mil/100 in.$^2$ 24 hrs atm (9.8 g 20 μm/m$^2$ 24 hrs atm) or less at 38° C., and (c) a Tg of 120° C. or higher; and that barrier film may further have (x) a Falling dart drop impact (Type A) of 250 g or greater for a 50 μm thick film material at room temperature and 50% relative humidity, (y) an Elmendorf tear of 600 g or greater at room temperature and 50% relative humidity, and (z) a notched Izod impact of 3 J/cm or greater at room temperature and 50% relative humidity. This illustrates the point that the multilayer film may satisfy any combination of the stated measures for properties (a), (b) and (c), and that it may comprise those properties alone or further in combination with one or more of the properties (x), (y) or (z), and any combination of the stated properties for properties (x), (y) and (z).

The BO-PEF polymer may form a film with similar or lesser barrier properties as described above, but with one or more of the following properties indicating toughness: (a) a Falling dart drop impact (Type A) of 200 g for a 50 μm thick film material at room temperature and 50% relative humidity (ASTM D1709) or greater; (b) an Elmendorf tear of 400 g for a 50 μm thick film material at room temperature and 50% relative humidity (ASTM D-1922) or greater; or (c) a notched Izod impact of 1.0 J/cm at room temperature and 50% relative humidity (ASTM D-256 for rigid materials) or greater; or combinations thereof.

The following examples illustrate the present invention.

Examples

Forming the Polymer

A typical synthesis procedure to form the PEF polymers for use in the multilayer films could be as follows:

DMF (2,5-dimethyl furandicarboxylate), the selected diol and ethylene glycol are charged into a reactor with vigorous mixing in presence of a catalyst like monobutyltin oxide and titanium n-butoxide under nitrogen. The temperature of the contents is slowly increased to 160° C. and kept at that temperature for about an hour while collecting methanol through a side-arm attached to vacuum. The temperature is then increased to 170° C. for an hour, followed by at 185° C. for two hours. The vacuum is slowly applied and is reduced to about 1 bar over about 1 hour or more. Finally, the temperature is further increased to 230° C. for about 4 hrs, followed by cooling to about ambient temperature.

| Example | Diester/Glycolide | Required Polyol | Other Polyol | Equivalent % Ethylene glycol in polyol blend |
|---|---|---|---|---|
| 1 | DMF | 2,2,4,4-tetramethyl-1,3-cyclobutanediol | Ethylene glycol | 50 |
| 2 | DMF | 1,3-/1,4-cyclohexanedimethanol | Ethylene glycol | 25 |
| 3 | DMF/DMN (1:1 equiv ratio) | 2,2,4,4-tetramethyl-1,3-cyclobutanediol | Ethylene glycol | 50 |

| Example | Diester/Glycolide | Required Polyol | Other Polyol | Equivalent % Ethylene glycol in polyol blend |
|---|---|---|---|---|
| 4 | DMF/DMN (1:1 equiv ratio) | 2,2,4,4-tetramethyl-1,3-cyclobutanediol & 1,3-/1,4-cyclohexanedimethanol (1:1 equiv ratio) | Ethylene glycol | 50 |
| 5 | DMF | Isosorbide | | |
| 6 | DMF | Isosorbide | Ethylene glycol | 15 |
| 7 | Glycolide/DMF (1:1 equiv ratio) | Isosorbide | | |
| 8 | Glycolide/DMF(1:1 equiv ratio) | Isosorbide | Ethylene glycol | 15 |
| 9 | DMN/DMF (1:1 equiv ratio) | Isosorbide | | |
| 10 | DMN/DMF(1:1 equiv ratio) | Isosorbide | Ethylene glycol | 15 |
| Comp. | Dimethylterephthalate (DMT) | | Ethylene glycol | |

The comparative example incorporates only DMF and excess ethylene glycol in the process of the above example.
Analytical: MW Measurements:
HPLC by Waters.
Detector: A differential refractometer
Eluent: A 5-Mm solution of sodium trifluoroacetate in hexafluoroisopropanol
Flow rate: 1.0 ml/min
Column Temperature: 40° C.
Standard: Polymethyl methacrylate (PMMA) resin.
Forming the Film
The polyester-based polymers with the compositions as described in the preparations above may be formed into biaxially-oriented films as follows:
  the polymer is sufficiently dried and extruded onto casting drum (provides smooth surface to plastic film).
  the resulting film is stretched 2 to 7 times in both the forward and transverse directions, either in a simultaneous process or sequentially
    Sequential Draw process: the film's forward draw is over a series of precision motorized rollers; transverse or sideways draw uses diverging clips in a multiple zoned oven with tightly controlled temperatures
    Simultaneous Draw process: the film is drawn using precision controlled simultaneously diverging, and accelerating clips through a multiple zoned oven with tightly controlled temperatures
  tension and temperatures are maintained properly to ensure final quality of the film
  the film is wound into large master rolls, which can optionally be slit to precision widths
  the film thickness typically ranges from 1 μm to 350 μm.
Forming the Microlayer Film
First Polymer=polyethylene terephthalate (PET)
Second Polymer=BO-PEF polymer is formed as described above.

To ensure polymer material rheological compatibility for coextrusion and maximize layer uniformity and overall film quality, a viscosity-match temperature for coextrusion is determined for the two polymers. Polymer melt viscosity is determined as a function of temperature using a Kayeness Galaxy 1 melt flow indexer (MFI) at a low shear rate, $10 \text{ s}^{-1}$. The low shear rate is selected to simulate polymer flow conditions in the layer multiplying dies of the polymer melt streams during the layer multiplication process. Coextrusion temperature of 250° C. and 240° C. is selected.

Films with alternating PET and BO-PEF are fabricated using a forced assembly layer-multiplying coextrusion process. The extruders, multiplier elements and die temperatures are set at 250° C., to ensure matching viscosities of the two polymer melts during processing. The films are collected on a heated cast-film takeoff roll set at a temperature of 60° C.

Microlayer components with 257 alternating PET and BO-PEF1 layers are coextruded. The composition is fixed by fixing the relative pump rates of each polymeric material. The nominal microlayer thickness, calculated from the number of layers, the composition ratio, and film thickness, varies from 80 to 120 nm.

Coextruded film samples are post-extrusion thermally treated at 130° C. for 5 minutes in an oil bath and then are cooled to 70° C. at a rate of 0.5° C./min and then maintained at the temperature for 16 hours for re-crystallization. Coextruded film samples may be post-extrusion thermally treated at 130° C. for 1 hour in a convection oven, then are cooled to 85° C. at a rate of 0.3° C./min and are maintained at the temperature for 16 hours for re-crystallization.

What is claimed is:

1. A multilayer film comprising (a) a biaxially-oriented polyethylene furanoate (BO-PEF) polymer layer, (b) an optional ink layer, (c) a bonding layer, and (d) a sealant layer, wherein the BO-PEF polymer layer has (i) an O2 gas permeability of 0.25 cc-mil/100 in.2 24 hrs atm (5 cc 20 μm/m2 24 hrs atm) at 80% relative humidity (ASTM D-3985) or less, or (ii) a moisture permeability of 0.5 g-mil/100 in.2 24 hrs atm (9.8 g 20 μm/m2 24 hrs atm) at 38° C. (ASTM F-1249) or less, or (iii) both, and
  wherein the BO-PEF polymer layer comprises a microlayer sequence comprising a number, n, of repeating units, each repeating unit comprising at least two microlayers, (a) and (b),
  wherein (a) is a first polymer with a melting point of at least 5° C. greater than the melting point of second polymer (b); and
  wherein second polymer (b) is a BO-PEF polymer formed from one or more diacid or diester monomers selected from the group consisting of 2,5-furan dicarboxylic acid (FDCA) and $C_1$ to $C_{10}$ alkyl diesters thereof, wherein said monomers comprise at least 35 mole % of the BO-PEF polymer, said microlayer sequence being characterized by the absence of any tie layer between microlayers (a) and (b), such that the resulting structure has the formula {(a)(b)(c)}n, where (c) represents one or more optional additional layers which may be the same or different from layers a and b, but which layer(s) (c) are not tie layers.

2. The multilayer film of claim 1 wherein the BO-PEF polymer has (a) a weight average molecular weight of 20,000 to 100,000 and (b) a polydispersity index of less than 4.

3. The multilayer film of claim 1, wherein 100 mole % of diacid or diester monomers used to form the BO-PEF polymer are selected from the group consisting of FDCA and $C_1$ to $C_{10}$ alkyl diesters thereof.

4. The multilayer film of claim 1, wherein the diacid or diester monomers used to form the BO-PEF polymer further comprises up to 65 mole % of 2,6-naphthalene dicarboxylic acid (NDCA), one or more $C_1$ to $C_{10}$ alkyl diester thereof, glycolide, or combinations thereof.

5. The multilayer film of claim 1 wherein the BO-PEF layer is coated with a layer of polyvinylidene chloride (PVDC) polymer.

6. The multilayer film of claim 1 wherein the sealant layer comprises one or more layers of polyethylene (PE) polymer.

7. The multilayer film of claim 6 wherein the sealant layer comprises one or more polymers selected from the group consisting of low-density polyethylene (LDPE), linear low-density polyethylene (LLDPE), very low-density polyethylene (VLDPE), ethylene vinyl acetate (EVA), and polypropylene (PP).

8. The multilayer film of claim 1 further comprising one or more layers of ethylene vinyl alcohol (EVOH).

9. The multilayer film of claim 8 wherein the film comprises tie layers between adjacent layers of sealant layer and EVOH layers.

10. The multilayer film of claim 1 further comprising an abuse layer formed from a polymer selected from the groups consisting of a polyolefin, polyethylene terephthalate and nylon.

11. The multilayer film of claim 1 further comprising a foil or metalized layer.

12. The multilayer film of claim 1 which does not contain a foil or metalized layer.

* * * * *